July 29, 1952  A. L. SAMUEL  2,605,323

WAVE TRANSMISSION

Filed Aug. 31, 1946  3 Sheets-Sheet 1

INVENTOR
A. L. SAMUEL
BY
N. D. Ewing
ATTORNEY

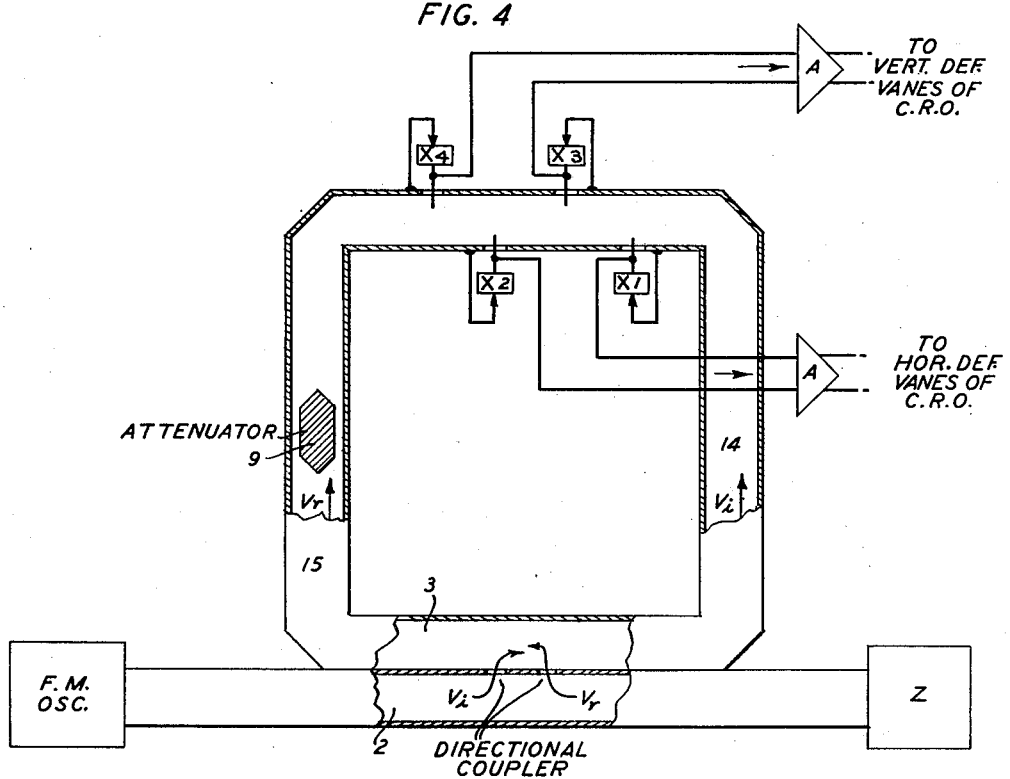
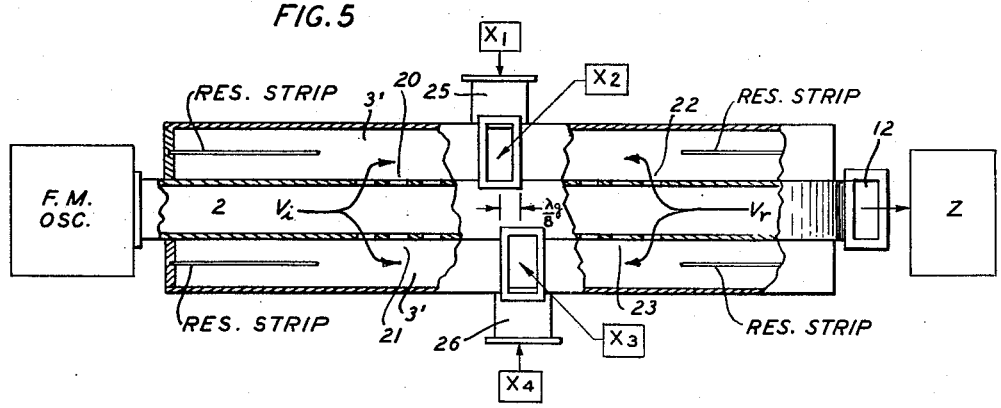

July 29, 1952  A. L. SAMUEL  2,605,323
WAVE TRANSMISSION
Filed Aug. 31, 1946  3 Sheets-Sheet 3
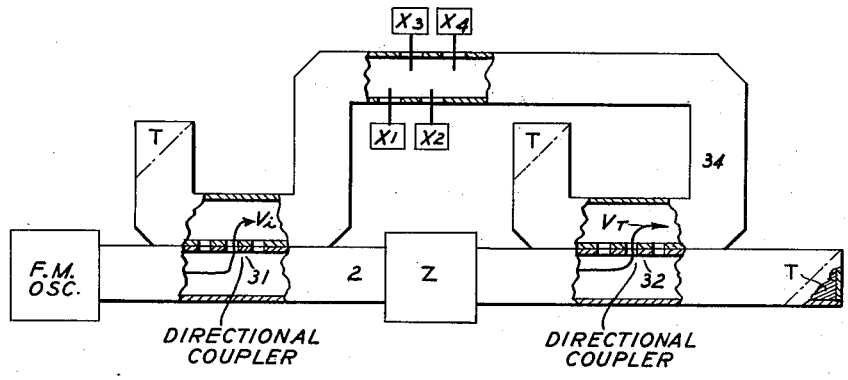
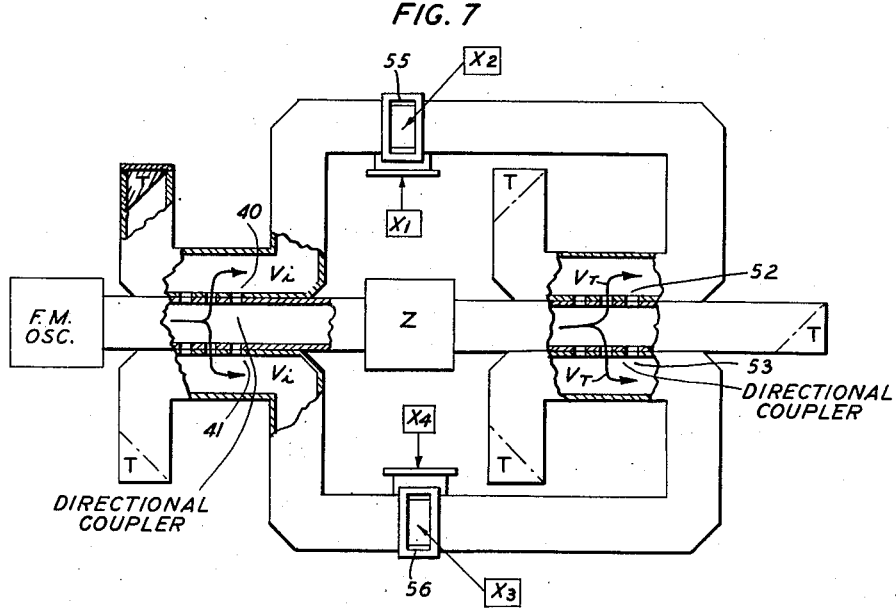
INVENTOR
A.L. SAMUEL
BY
N. S. Ewing
ATTORNEY Patented July 29, 1952

2,605,323

UNITED STATES PATENT OFFICE 2,605,323

WAVE TRANSMISSION

Arthur L. Samuel, Champaign, Ill., assignor to Bell Telephone Laboratories, Incorporated, New York, N. Y., a corporation of New York Application August 31, 1946, Serial No. 694,343

6 Claims. (Cl. 175—183)

This invention relates to wave guide forms of transmission and more particularly to measuring devices for determining impedance characteristics therewith.

An object of the invention is to visually present in the microwave range and the like, the reflection coefficient of impedances both in amplitude and phase.

Another object of the invention is to visually represent transmission-frequency characteristics of unknown impedances in the microwave range under steady state and transient state conditions.

A feature of the invention is a $$\frac{\lambda_g}{8}$$

spacing of crystal detectors in a wave guide fed by constant amplitude, frequency-modulated waves.

Another feature of the invention is a pairing of four such spaced crystals into two pairs, each pair being characterized by a $$\frac{\lambda_g}{4}$$

spacing and a poling in opposition between member crystals.

Another feature of the invention is a frequency modulated source of constant amplitude connected to a main wave guide terminated in the unknown impedance.

Another feature is the use of sampling directional couplers connected to the main wave guide for reducing the ratio of reflected to incident waves whereby crystal-law errors may be minimized.

Another feature of the invention is a terminated wave guide fed by input waves of constant amplitude over an extended frequency range, and the derivation by detection therefrom of two separate voltages proportional to $V_r \cos \theta$ and $V_r \sin \theta$ for application to the horizontal and vertical deflecting vanes respectively of an oscilloscope, where $V_r$ represents the amplitude of waves reflected by the termination and $\theta$ their phase angle relative to the incident waves.

An experimental determination at ultra-high frequencies of the input impedance as a function of frequency for any proposed circuit element requires measurements of its complex impedance at a number of different frequencies over a prescribed frequency range. A common method therefor involves, (1) observations of the standing wave along a uniform transmission line terminated by the unknown impedance, (2) the computation from these observations and data of the input impedance or of the reflection coefficient at a number of different frequencies and (3) the presentation of these data on a transmission line chart, usually of the reflection-coefficient-plane type.

The oscillographic method, which is to be described, offers a convenient and rapid method of presenting the data directly and visually in the desired form without computation. The principal advantage of this method over the conventional point-by-point method is one of speed and convenience. Also, it is possible with the oscillographic method to observe the variations in the input impedance of devices under transient conditions, for example, such as are produced by rotating joints or by random variations in the input impedance of an antenna produced by reflections.

In accordance with the invention, applicant provides an apparatus and method for oscillographically presenting the reflection coefficient both in amplitude and phase over the ultrahigh frequency and microwave range. A frequency modulated source provides constant amplitude input waves $V_i$ over an extended frequency range for a wave guide or coaxial transmission line either terminated in an impedance to be measured or having an inserted four-terminal circuit element therein, whose transmission-frequency characteristics are to be determined. Four detecting crystals, are arranged along the guide and paired in couples in such a way as to mix the incident wave $V_i$ and reflected wave $V_r$ to derive thereby separate voltages proportional to $V_r \sin \theta$ and $V_r \cos \theta$ where $\theta$ represents the phase angle of $V_r$, for application to the horizontal and vertical deflecting plates respectively of the oscilloscope.

The oscilloscope electron beam thereby traces on the screen in polar coordinates $r$, $\theta$ curves or patterns which represent the frequency variation of the reflection coefficient in amplitude and phase.

The arrangement of crystals for providing deflecting voltages for the vanes or plates of the oscilloscope, involves a $$\frac{\lambda_g}{8}$$

spacing of the crystals along the guide and a pairing of the crystals spaced $$\frac{\lambda_g}{4}$$

from each other. The outputs of the respective crystals of a pair are poled subtractively or in opposition to leave a resultant voltage of the form $V_i V_r \cos \theta$ and $V_i V_r \sin \theta$.

Matched square-law operation crystals are desirable, but may be replaced by other crystals deviating in their operation from the square-law characteristic. In the latter case, provision is made for satisfactory operation of the system by the use of sampling directional couplers or attenuator strips for reducing the ratio of the reflected power to the incident power, and providing a linear type of operation for the crystal mixers.

Fig. 4 illustrates another modification using a single directional coupler and an attenuator;

Fig. 5 illustrates a modification using hybrid T's and directional couplers;

Figs. 6 and 7 show modified circuits for determining transmission characteristics.

Figure 1:
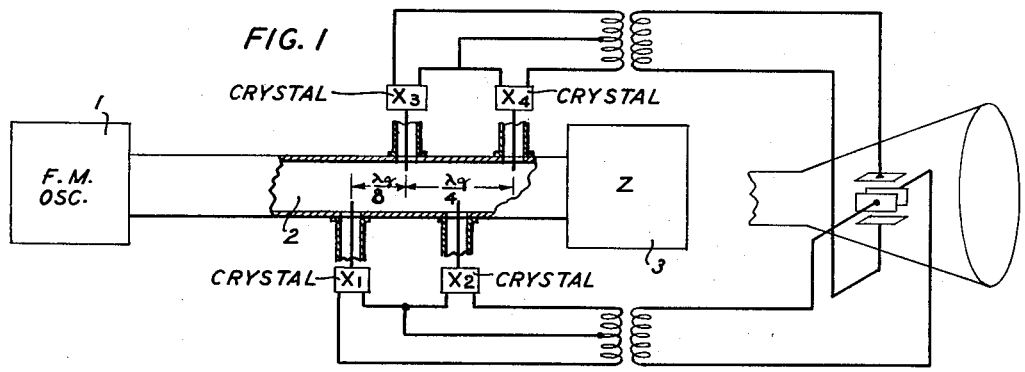
Fig. 1 shows a schematic of the impedance viewer circuit.

A simple apparatus for supplying the oscilloscope with the deflecting voltages $V_r \cos \theta$ and $V_r \sin \theta$ is shown schematically in Fig. 1.

A frequency modulated oscillator 1 supplies input waves $V_i$ of constant amplitude over a frequency band centered in the ultra-high frequency or microwave range to a transmission line 2, terminated by an impedance 3 to be measured. The impedance 3 which may, for example, be a tube, a resonant cavity, or some substance endowed with resistive and reactive properties, may set up standing waves in the transmission line. The amplitude of the reflected wave will be represented by $V_r$.

The frequency modulated oscillator 1 is of the magnetic focussed, velocity modulated type, characterized by two spaced resonant cavities as disclosed in the United States application of A. L. Samuel, Serial No. 441,937, filed May 6, 1942, now Patent No. 2,410,840, and using a small diameter feedback section. Frequency modulation is accomplished by a small silver vane which is rotated in the one cavity at 1800 revolutions per minute by a synchronous motor. The cavity oscillates in its second TE mode. The tube is at one voltage maximum and the rotating vane is at the other. The vane varies the capacity at the second voltage maximum.

A permanent magnet is used in the focussing of the electron beam. This oscillator has a frequency sweep of 500 megacycles centered about 4200 megacycles.

It should be understood that it may be possible to use other forms of frequency modulated oscillators using tubes of the reflex, single cavity or other types.

Four probes and corresponding crystals $X_1$, $X_2$, $X_3$ and $X_4$ are used to sample the waves existing in the transmission line 2, which may be either a wave guide as shown or a coaxial line. These pick-up probes are connected in pairs, the two probes of each pair being spaced along the line by a quarter wavelength $$\left(\frac{\lambda_g}{4}\right)$$

while the two pairs are staggered by an eighth wavelength $$\left(\frac{\lambda_g}{8}\right)$$

where $\lambda_g$ is the wavelength in the guide. The output from each probe goes directly to a corresponding crystal detector. The two crystals $X_1$, $X_2$ of one pair of probes are balanced, the difference in their outputs being impressed on one pair of deflection vanes, i. e., the horizontal deflection vanes in the oscilloscope. Similarly, the difference in the outputs from the second pair $X_3$, $X_4$ is impressed in a like manner on the other pair of deflecting vanes, i. e., the vertical deflection vanes in the oscilloscope. If then, the input 1 to the transmission line 2 is varied in frequency but not in amplitude, and if the crystals follow a square law of operation, the oscilloscope spot will trace a path representing the desired curve on the reflection coefficient plane. The center of the reflection coefficient plane is located by interrupting the output of the driving oscillator 1 at the end of each frequency excursion.

Care must be taken to insure that the probes are not large enough to distort the fields in the wave guide or coaxial line seriously enough to produce interaction between probes. The connecting of the probes in pairs, spaced apart $$\frac{\lambda_g}{4}$$

tends to produce a cancellation of field distortion and thereby reduces interaction.

The mathematical verification for this result is extremely simple. If the incident wave, as seen by crystal ($X_1$), is constant at an amplitude $V_i$ and the reflected wave from Z is $V_r$, and its phase angle is $\theta$ for some fixed angular frequency $\omega$, then the output from this crystal is $$[V_i \cos \omega t + V_r \cos (\omega t + \theta)]^2 = \frac{V_i^2}{2} + \frac{V_r^2}{2} + V_i V_r \cos \theta + \text{R. F. terms} \quad (1)$$

At crystal ($X_2$) the incident wave $V_i$ will be delayed by $\pi/2$ radians and the reflected wave $V_r$ will be advanced by $\pi/2$ radians, corresponding to the time required by the waves to traverse the quarter wavelength section of transmission line separating the two probes. The output from crystal ($X_2$) will then be $$[V_i \cos (\omega t - \pi/2) + V_r \cos (\omega t + \pi/2 + \theta)]^2 = \frac{V_i^2}{2} + \frac{V_r^2}{2} - V_i V_r \cos \theta + \text{R. F. terms} \quad (2)$$

The difference in the outputs which appears between the horizontal deflection or abscissa vanes of the oscilloscope is $$2 V_i V_r \cos \theta$$

At crystal $X_3$, the incident wave will be delayed by $$\frac{\pi}{4}$$

while the reflected wave will be advanced by $$\frac{\pi}{4}$$

corresponding to the time required by the waves to traverse the $$\frac{\lambda}{8}$$

spacing between pairs.

Crystal ($X_3$) will have an output of $$[V_i \cos (\omega t - \pi/4) + V_r \cos (\omega t + \pi/4 + \theta)]^2 = \frac{V_i^2}{2} + \frac{V_r^2}{2} - V_i V_r \sin \theta + \text{R. F. terms} \quad (3)$$

Likewise crystal ($X_4$) will have an output of $$[V_i \cos(\omega t - 3\pi/4) + V_r \cos(\omega t + 3\pi/4 + \theta)]^2 =$$
$$\frac{V_i^2}{2} + \frac{V_r^2}{2} + V_i V_r \sin\theta + \text{R. F. terms} \quad (4)$$

The difference voltage for this pair which will be $$2V_i V_r \sin\theta$$

can be impressed on the vertical deflection or ordinate vanes of the oscilloscope. If $V_i$ is constant the deflected spot produced by the electron beam will lie at a distance proportional to $V_r$ from the center of the oscilloscope screen and at an angle $\theta$ which a line through the spot and the center of the screen makes with the horizontal axis of the oscilloscope. As the frequency of the oscillator is varied the beam spot will trace the value of $\overline{V_r}$ in magnitude and phase, and present a curve or pattern on the screen as shown by way of example in Figs. 2A and 2B. The proper scale factor for the oscilloscope and its accompanying amplifier can readily be obtained by terminating the transmission line in a short circuit so that $(V_r) = (V_i)$ and calling the accompanying deflection unity. Since by definition $V_r$ for unity $V_i$ is the reflection coefficient, the desired relationship has been verified.

Figure 2A:
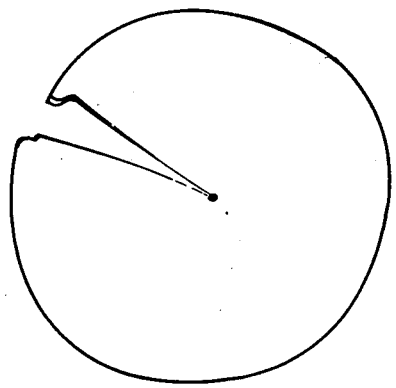
Figs. 2A, 2B show typical oscilloscope patterns obtained therewith.
Figure 2B:
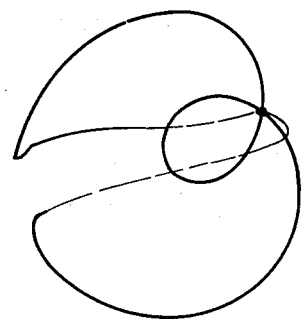

Some exemplary patterns or curves obtained with the impedance viewer circuit of Fig. 1 are illustrated in Figs. 2A and 2B. Fig. 2A shows the oscilloscope pattern when a long transmission line is terminated by a short circuit. This should, of course, be an arc of the unit circle, the length of the arc depending upon the length of the transmission line and upon the frequency excursion. The departure from a true circle is a measure of the refinement of construction in some components of the system. The irregularities at the ends of the circular arc in the picture are due to variations in input power level and a reversal in the direction of the frequency sweep during the switching period which are associated with the transient behavior of the power supply and switching circuits (not shown). Fig. 2B shows the input impedance Z of an over-coupled double-tuned circuit adjusted to match the transmission line at two different frequencies.

The reflection coefficient plane has been found to be a desirable medium for presenting impedance data. As is now generally known, the Smith chart which is disclosed in Electronics, January 1939, "Transmission line calculator" by P. H. Smith is obtained by a bilinear transformation to the reflection coefficient plane of the coordinate system on the impedance plane. Since the reflection coefficient is always less than unity (that is, for passive circuits) the plane is bounded by a unit circle, the reflection coefficient $\rho$ being given by the vector distance from the origin to any point on the plane. The impedance coordinates are transformed into orthogonal families of circles and the bilinear nature of the transformation requires that circles remain circles and that angles be preserved. Distance along a lossless transmission line appears on the chart as distance along the circumference of a circle coaxial with the center of the chart, the absolute magnitude of the reflection coefficient remains constant under these conditions. Since translation by a quarter wavelength along a transmission line results in an inversion of the impedances with respect to the line characteristic impedance, and since this corresponds to a rotation of $\pi$ radians on the reflection coefficient plane, a transformation between impedances and admittances requires only that the reference axis be rotated by $\pi$. Impedances plotted on the reflection plane can therefore be readily transformed into admittances and back to impedances as the occasion demands.

Crystal-law errors can be substantially eliminated by any arrangement which attenuates the reflected wave component $V_r$ so that it is always small compared with the direct wave component $V_i$. The action of the crystals in this case is analogous to a converter. The direct wave corresponds to the beating oscillator wave in the conventional converter and the reflected wave takes the place of the signal. This results in a linear signal response characteristic. It does not modify the requirements that the input power level be constant since the magnitude of the reflected wave will still vary with the magnitude of the incident wave.

A variety of different circuits are disclosed hereafter which permit the separation of the incident wave and reflected wave components so that one can be attenuated relative to the other. Such circuits are shown in Figs. 3 to 5, in terms of wave guide structures although they are equally well adapted to coaxial line systems.

Figure 3:
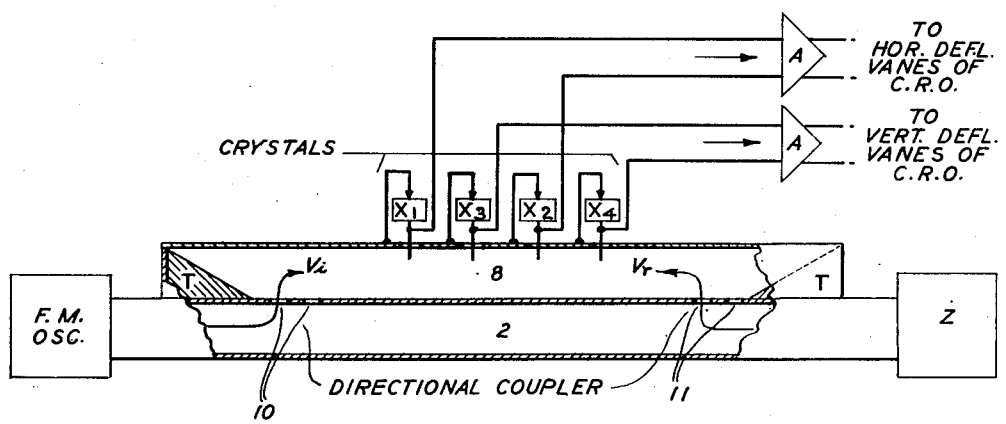
Fig. 3 illustrates a modification utilizing directional couplers.

In the circuit of Fig. 3, two directional couplers 10, 11 connected to the main wave guide 2 are used to sample the incident and reflected waves. The coupler 11 which samples the reflected wave set up by Z, the impedance to be measured may be constructed to have a greater coupling attenuation than the coupling attenuation of the coupler 10 sampling the incident wave. The probes and crystals $X_1$, $X_2$, $X_3$, $X_4$, in the secondary guide 8 then measure a reflection coefficient which is reduced by some desired factor with respect to the reflection coefficient of the impedance under test. Suitable allowance for this can then be made in the calibration of the oscilloscope so that the device is still direct reading.

The directional couplers 10, 11 are of the type described in the article entitled "Directional couplers" by W. W. Mumford appearing in the Proceedings of the I. R. E., vol. 35, pages 160–165, February 1947. At each end of the auxiliary guide 8, are positioned absorbing terminations T for dissipating undesired wave components.

The crystals $X_1$, $X_2$, $X_3$, $X_4$ of Figs. 1, 3, etc., may be silicon, germanium, or any other type normally used for detection and conversion at ultra-high frequencies and microwaves.

The crystal outputs from $X_1 X_2$, and $X_3 X_4$ in Fig. 3 are shown fed into amplifiers A, A respectively, which preferably are balanced with a large amount of negative feedback to any unbalanced components.

Provision must be made to adjust the gain of the two amplifiers to equality. Variations in crystal sensitivity can be compensated by varying the probe length or by means of potentiometers. However, it is not sufficient to adjust the crystals to the same sensitivity at a single level only. If the crystals do not follow the same law, the cancellation of the mathematical terms in the above analysis will not occur. In the equipment used to obtain the curves of Figs. 2A and 2B no effort was made to select crystals which matched and the curves are therefore not exact. This type of error is reduced by the same expedient which eliminates the effects of non-square law operation of the crystals.

It should also be noted that care must be exercised in the design of the crystal circuits to make them sufficiently broad in their frequency response characteristic so that their outputs remain level over the band.

It is, of course, possible to use only one directional coupler as shown by Fig. 4. The use of a resistive attenuator 9 for reducing the ratio of $V_r$ to $V_i$ then becomes mandatory if an improvement in linearity is to be obtained. In general, the use of a single directional coupler as in Fig. 4 to sample both wave components imposes severe requirements on impedance matching.

In operation, the incident wave $V_i$ from the frequency modulation oscillator is sampled by the directional coupler and propagated along the arm 14 of the auxiliary wave guide 3. The reflected wave $V_r$ due to the impedance Z is sampled by the directional coupler and propagated into arm 15, where its level with respect to $V_i$ may be reduced sufficiently by attenuator 9 with impedance matching, tapered terminals, to substantially eliminate the effects of crystal-law deviations.

The use of directional couplers to sample the waves $V_i$, $V_r$ also makes it possible to dispense with the use of probes as shown in Figs. 1, 3 and to use hybrid T junctions to obtain the necessary additions and subtractions. Such a circuit using wave guides is shown in Fig. 5, and is characterized by broad-band frequency characteristics.

Two input directional couplers 20, 21 and two output directional couplers 22, 23 are shown, with the sampling of incident and reflected waves represented by arrows as shown.

A sampled incident wave is applied from coupler 20 to the hybrid T 25 at one end and a sampled, reflected wave from coupler 22 is applied at the opposite end. Additions and subtractions take place in crystals $X_1X_2$ connected to the conjugates E and H branches respectively of the hybrid T 25.

A similar action takes place with respect to incident and reflected wave samplings in the second hybrid T 26, which is displaced $$\frac{\lambda_g}{8}$$

from hybrid T 25 to provide the necessary phase difference.

The hybrid T's 25, 26 are of the type disclosed in the United States application of W. A. Tyrrell, Serial No. 581,285 filed March 6, 1945, now Patent No. 2,445,896 and provide the substantial equivalent of a $$\frac{\lambda_g}{4}$$

probe spacing in the electric (E) and magnetic (H) arms thereof.

The balanced crystal outputs are then routed to the oscillograph amplifiers as previously described.

In Fig. 5, the unknown impedance Z is connected to an end section 12, bent up perpendicularly to the main wave guide 2.

The resistance strip terminations, which are located at the ends of the auxiliary guides 3', 3' eliminate by absorption undesired waves.

The crystals $X_1X_2X_3X_4$ in Fig. 5 are designed for broad-band operation, and the pick-ups associated therewith have enlarged knobs or heads.

The sensitivity of the directional coupler and hybrid junction system (Fig. 5) can be made somewhat greater than that of the simple probe method since it is possible to obtain much larger samples of the incident wave by these means. The method suffers from the fact that greater lengths of line are involved and this tends to limit the frequency range over which reasonable accuracy can be obtained. As satisfactory hybrid T junctions are less easily constructed in coaxial line systems, the construction in Fig. 5 is deemed more practical in wave guide systems.

The circuits illustrated in Figs. 6 and 7 are intended to measure transmission-frequency characteristics of four-terminal networks interposed in a transmission line or wave guide, and to present the transfer impedance (or admittance) oscillographically in amplitude and phase. Specifically, in the circuit of Fig. 6, the incident wave $V_i$ is sampled by means of an input directional coupler 31 and combined with a sample of the transmitted wave $V_T$, derived from the output of network Z and propagated into guide section 34. The output directional coupler 32 is located on the main wave guide beyond the network Z. The additions and subtractions by means of crystals $X_1X_2X_3X_4$ and the probes occur in a manner similar to that described previously for Fig. 1.

The terminal strips T are absorbers similar in structure and function to the resistive strips of Fig. 5.

The circuit of Fig. 7 is analogous in structure to that shown in Fig. 5, using input directional couplers 40, 41, output directional couplers 52, 53, and hybrid T's 55, 56 to measure oscillographically the transmission properties of a four-terminal network both in amplitude and phase.

What is claimed is:

1. Apparatus for measuring the reflection coefficient of an impedance-terminated wave guiding passage from the direct and reflected waves therein comprising in combination, means for impressing ultra-high frequency constant amplitude waves upon said passage, directional coupler means coupled to said passage for deriving oppositely directed waves outside said passage proportional to said direct and reflected waves, respectively, means for deriving from said derived oppositely directed waves a first wave sample and a second wave sample displaced 90 degrees in phase therefrom, whereby said samples correspond in relative amplitude and phase with the waves at two points in said passage spaced substantially $$\frac{\lambda_g}{4}$$

apart, where $\lambda_g$ is the wavelength in the guide, means for deriving third and fourth wave samples displaced 90 degrees in phase apart and corresponding likewise in relative amplitude and phase with said waves at two other points in said passage, one of said points being spaced midway of the first said two points and the other a $$\frac{\lambda_g}{4}$$

from said one point, means for rectifying each of said wave samples, means for differentially combining the rectified said first and second wave samples to obtain a voltage proportional to $V_r \cos \theta$ and said third and fourth wave samples to obtain a voltage proportional to $V_r \sin \theta$, where $V_r$ represents the amplitude of the reflected wave and $\theta$ its phase angle relative to the direct wave.

2. Apparatus for measuring the reflection coefficient of an impedance-terminated main wave guiding passage from the direct and reflected waves therein comprising in combination, an ultra-high frequency source of constant amplitude waves connected to said main wave guiding passage, directional coupler means comprising auxiliary wave-guide means having absorbing impedance terminations, said directional coupler means being coupled to said main passage for deriving superposed oppositely directed waves in said auxiliary wave-guide means proportional to said direct and reflected waves respectively, said directional coupler means having different directionally-selective coupling attenuations for the said direct and reflected waves, means for deriving from said waves in said auxiliary wave-guide means a first pair of wave samples corresponding in relative amplitude and phase with said waves at points in said main passage spaced substantially $$\frac{\lambda_g}{4}$$

apart, where $\lambda_g$ is the wavelength in the guide, means for deriving from said waves in said auxiliary wave-guide means a second pair of wave samples corresponding likewise in relative amplitude and phase with said waves at two other points in said main passage, one of said points being spaced midway of the first said two points and the other a $$\frac{\lambda_g}{4}$$

from said one point, means for rectifying each of said wave samples, means for differentially combining the said first pair of wave samples to obtain a voltage proportional to $V_r \cos \theta$ and the said second pair of wave samples to obtain a voltage proportional to $V_r \sin \theta$, where $V_r$ represents the amplitude and $\theta$ the phase angle of said reflected wave relative to said direct wave.

3. An impedance viewer for representing the reflection coefficient of an impedance-terminated main wave guiding passage from the direct and reflected waves therein comprising in combination, means for impressing frequency-modulated constant amplitude waves extending over a limited frequency range upon said main passage, directional coupler means comprising an auxiliary wave-guide passage having absorbing impedance terminations at each of its ends, said directional coupler means having directionally-selective aperture couplings to said main passage for deriving superposed oppositely directed waves in said auxiliary passage proportional to said direct and reflected waves respectively, said directional coupler means having different directionally-selective coupling attenuations for the said direct and reflected waves, four coupling probes connected to said auxiliary passage at successive points separated by approximately $$\frac{\lambda_g}{8}$$

in the guide at the frequency of said impressed waves for deriving from said waves in said auxiliary passage a first and second pair of wave samples corresponding in relative amplitude and phase with said waves at similarly spaced points in said main passage, mixing crystal detectors connected to each of said coupling probes for rectifying said wave samples, means for differentially combining the rectified wave samples from pairs of alternate ones of said coupling probes to obtain two separate voltages related in amplitude and phase to said reflection coefficient, a cathode-ray oscilloscope including means for deflecting the cathode ray in mutually perpendicular directions, and means for applying each of said voltages to a respective one of said deflecting means to present said reflection coefficient as a polar diagram.

4. Apparatus for measuring the reflection coefficient of an impedance-terminated main wave guiding passage from the direct and reflected waves therein comprising in combination, means for impressing ultra-high frequency constant amplitude waves upon said main passage, directional coupler means comprising a pair of auxiliary wave-guide passages on opposite sides of said main passage, said auxiliary passages having resistive terminations at each of their respective ends, said directional coupler means being coupled to said main passage for deriving oppositely directed waves in each of said auxiliary passages proportional to said direct and reflected waves respectively, said directional couplers having different directionally-selective coupling attenuations for the said direct and reflected waves, a pair of wave-guide hybrid T's each disposed in a different one of said auxiliary passages, said hybrid T's being displaced relative to one another by substantially $$\frac{\lambda_g}{8}$$

of said waves impressed upon said main passage, where $\lambda_g$ is the wavelength in the guide, mixing crystal detectors inserted in the conjugate arms of each of said hybrid T's, means for differentially connecting the said detectors of respective hybrid T's in pairs to obtain a first voltage proportional to $V_r \cos \theta$ from one of said hybrid T's and a second voltage proportional to $V_r \sin \theta$ from the other of said hybrid T's, where $V_r$ represents the amplitude and $\theta$ the phase angle of said reflected wave relative to said direct wave.

5. An impedance viewer for representing the reflection coefficient of an impedance-terminated main wave guiding passage from the direct and reflected waves therein comprising in combination, means for impressing frequency-modulated constant amplitude waves extending over a limited frequency range upon said main passage, a pair of directional couplers comprising a pair of auxiliary wave-guide passages on opposite sides of said main passage, said auxiliary passages having resistive terminations at each of their respective ends, each of said directional couplers having a first directionally-selective aperture coupling to said main passage at one point and, at a second point spaced from said first point, a second directionally-selective aperture coupling to said main passage for deriving oppositely directed waves in each of said auxiliary passages proportional to said direct and reflected waves respectively, said directional couplers having different directionally-selective coupling attenuations for the said direct and reflected waves, a pair of wave-guide hybrid T's each having their collinear arms in respective ones of said auxiliary passages, said hybrid T's being displaced relative to each other by approximately $$\frac{\lambda_g}{8}$$

at the frequency of said waves impressed upon said main passage, where $\lambda_g$ is the wavelength in the guide, mixing crystal detectors inserted in the conjugate arms of each of said hybrid T's, means for differentially connecting the said detectors of respective hybrid T's in pairs to obtain two separate voltages related in amplitude and phase to said reflection coefficient; a cathode-ray oscilloscope including means for deflecting the cathode ray in mutually perpendicular directions, and means for applying each of said voltages to a respective one of said deflecting means to present said reflection coefficient as a polar diagram.

6. An impedance viewer for representing the reflection coefficient of an impedance-terminated main wave guiding passage from the direct and reflected waves therein comprising in combination, means for impressing frequency-modulated constant amplitude waves extending over a limited frequency range upon said main passage, a pair of directional couplers comprising a pair of auxiliary wave-guide passages on opposite sides of said main passage, each of said directional couplers having a first directionally-selective aperture coupling to said main passage at one point and, at a second point spaced from said first point, a second directionally-selective aperture coupling to said main passage for deriving oppositely directed waves in each of said auxiliary passages proportional to said direct and reflected waves respectively, a pair of wave-guide hybrid T's each having their collinear arms in respective ones of said auxiliary passages, said hybrid T's being displaced relative to each other by approximately $$\frac{\lambda_g}{8}$$

at the frequency of said waves impressed upon said main passage, where $\lambda_g$ is the wavelength in the guide, mixing detectors inserted in the conjugate arms of each of said hybrid T's, means for differentially connecting the said detectors of respective hybrid T's in pairs to obtain two separate voltages related in amplitude and phase to said reflection coefficient, means for combining said two voltages in space quadrature, and means for indicating the vector sum of said quadrature voltages to present said reflection coefficient as a polar diagram.

ARTHUR L. SAMUEL.

REFERENCES CITED

The following references are of record in the file of this patent:

UNITED STATES PATENTS

| Number | Name | Date |
| --- | --- | --- |
| 2,337,934 | Scheldorf | Dec. 28, 1943 |
| 2,404,797 | Hansen | July 30, 1946 |
| 2,413,939 | Benware | Jan. 7, 1947 |
| 2,416,790 | Barrow | Mar. 4, 1947 |
| 2,420,892 | McClellan | May 20, 1947 |
| 2,423,390 | Korman | July 1, 1947 |
| 2,442,606 | Korman | June 1, 1948 |
| 2,445,895 | Tyrrell | July 27, 1948 |
| 2,445,896 | Tyrrell | July 27, 1948 |
| 2,456,800 | Taylor et al. | Dec. 21, 1948 |
| 2,522,563 | Blitz | Sept. 19, 1950 |
| 2,527,979 | Woodward, Jr. | Oct. 31, 1950 |
| 2,531,777 | Marshall | Nov. 28, 1950 |